US006951508B1

(12) United States Patent
Brubacher

(10) Patent No.: US 6,951,508 B1
(45) Date of Patent: Oct. 4, 2005

(54) OPTICAL FIBER POLISHING DEVICE

(76) Inventor: Michael J. Brubacher, 6222 E. Janice Way, Scottsdale, AZ (US) 85254

( * ) Notice: Subject to any disclaimer, the term of this patent is extended or adjusted under 35 U.S.C. 154(b) by 0 days.

(21) Appl. No.: 10/674,958

(22) Filed: Sep. 29, 2003

Related U.S. Application Data

(60) Provisional application No. 60/415,166, filed on Sep. 30, 2002.

(51) Int. Cl.[7] .............................................. B24B 1/00
(52) U.S. Cl. ........................ 451/41; 451/64; 451/273
(58) Field of Search ........................... 451/41, 42, 64, 451/259, 282, 272, 273, 213, 331

(56) References Cited

U.S. PATENT DOCUMENTS

| | | | | |
|---|---|---|---|---|
| 2,329 A | * | 11/1841 | Cornell ..................... | 125/13.01 |
| 179,056 A | * | 6/1876 | Purdy et al. ................. | 451/273 |
| 4,178,722 A | * | 12/1979 | Forman et al. ............. | 451/359 |
| 4,587,768 A | * | 5/1986 | Doyle ........................ | 451/276 |
| 5,184,433 A | * | 2/1993 | Maack ........................ | 451/41 |
| 5,810,646 A | * | 9/1998 | Hepworth ................... | 451/273 |
| 5,823,859 A | * | 10/1998 | Erdogan et al. ............. | 451/65 |
| 6,183,343 B1 | * | 2/2001 | Buzzetti ........................ | 451/5 |
| 6,186,871 B1 | * | 2/2001 | Crocker et al. ............... | 451/41 |
| 6,488,567 B1 | * | 12/2002 | Flanders et al. .............. | 451/6 |
| 2003/0190875 A1 | * | 10/2003 | Grabbe ........................ | 451/65 |

* cited by examiner

*Primary Examiner*—David B. Thomas
(74) *Attorney, Agent, or Firm*—Gregory J. Nelson

(57) ABSTRACT

A device for polishing having a polishing wheel for mounting an arbor to which a film can be secured. The wheel is either manually or motor driven. A ferrule holder is on a carrier also driven by the drive shaft at a predetermined indexed rate. The polishing procedure may be acoustically monitored.

16 Claims, 3 Drawing Sheets

OPTICAL FIBER POLISHING DEVICE

CROSS REFERENCE TO RELATED APPLICATION IS MADE

This application is related to provisional patent application Ser. No. 60/415,166, filed Sep. 30, 2002, of the same title.

FIELD OF THE INVENTION

The present invention relates generally to the field of optical fibers and more particularly relates to a device for polishing the ends of optical fibers which are captured within a ferrule.

BACKGROUND OF THE INVENTION

Optical fibers are utilized in optical transmission systems to transfer light. Optical fibers are generally provided in various standard sizes such as 3 micron, 9 micron, 50 micron 62.5 micron, as well as other sizes. The micron size refers to the diameter of the light transmitting fiber, or core, which is encased within an exterior cladding. Thus, a fiber designated as 3/125 will have a 3 micron fiber diameter core and the cladding will have an outer diameter of 125 microns.

The fibers terminate at ferrules which have a body of ceramic or other material. When making a connection between two fiber optic cables, the ferrules on the ends of the two cables fibers are coupled together at a connector to maintain the ferrules in alignment and in close contact to minimize insertion and reflective losses. Light will be lost if the ends of the fibers are separated as a gap will allow light to escape.

In order to insure good face-to-face contact and good light transmission between abutting fiber optic ends, the ends are inserted into ferules and glued in place. The projecting fibers are normally cleaved and thereafter initially polished and reduced in length by polishing/grinding to trim the longer, projecting fibers end or nubs with a coarse polishing film. Initial polishing reduction is normally followed by a second, finer polishing. This two step procedure is required as subjecting the cleaved fibers to machine finer polishing will cause the fibers to break due to the length of the nubs and roughness of the fiber ends. Thus, the first step is normally an air polishing which is performed by manually polishing or polishing/grinding the fiber ends with a polishing film of predetermined coarser grit. After the initial step, one or more subsequent fine polishing steps may occur which can be performed manually or using devices or machines for this purpose.

Various types of fiber end surface polishing devices can be found in the prior art. Some of these are simply a hand tool through which the fiber optic terminal extends. The fiber optic terminal is gripped by a chuck or collar and the user manually moves the hand tool containing the fiber optic tip in a random motion over a polishing surface.

Other polishing machines are available such as the OFL-12A polishing machine from Seiko® and the SpecMaster II Mass Fiber Optic Connector Polishing System from Krell. The more sophisticated polishing machine such as the Seiko and Krell polishers work well, but are expensive, require a high degree of operator skill and are generally not suitable for field use.

Manual polishing devices and techniques, while inexpensive and more suitable for field use, often do not produce the desired optical surface and, further, use of these devices results in waste as a substantial area of the polishing film remains unused when discarded or replaced.

The present invention provides an improved fiber optic polishing device which is inexpensive in first cost, which may be operated either at a manufacturing facility or in the field by an individual after minimal training, and which device results in efficiency of operation labor while expending most of the polishing film surface area to reduce waste.

BRIEF SUMMARY OF THE INVENTION

A primary object of the present invention is to provide a new and improved optical fiber polishing device which is suitable for both field and manufacturing facility use which device is simple, easy to operate and better utilizes the polishing film reducing waste. Briefly, the device of the present invention is utilized for polishing the end face of an optical fiber contained within a ferrule. Typically the end of the optical fiber projects from the ferrule at small nubs after cleaving when cut or cleaved.

The device of the present invention includes a base plate which supports a frame. A drive shaft is mounted in bearings in the frame and may be manually operated by a hand-wheel connected to a flywheel or may be driven by a small, reversible DC motor. The drive shaft is connected to a generally circular polishing mounting wheel having a generally planar surface. A polishing film of selected grit is adhesively applied to an arbor plate of glass or rubber over glass or which is detachably securable to the polishing wheel. The arbor may be planar or may define a recess so an air gap or cushion exists behind the polishing film. The air gap creates an acoustic chamber by which small sounds are greatly amplified. It will be understood that said arbor plate may be fabricated of other suitable materials.

The drive shaft, through a transmission including a series of gears, also drives a lead screw that is rotatively mounted extending adjacent the polishing wheel. Polishing may be a two-step procedure: first utilizing polishing film mounted on the arbor plate having an air gap which establishes acoustic qualities followed by polishing using a film on the planar arbor plate.

A carrier block is indexed and traverses the polishing wheel surface on the lead screw at a predetermined rate preferably advancing a distance equal to the cable fiber diameter each rotation of the shaft. A chuck or holder for the ferrule connector is located on the carrier having one or more bores corresponding to the configuration of the connector containing the ferrule to be polished. The bore may be oriented to polish the end of the ferrule either in a plane perpendicular to the axis of the ferrule or at an angle depending upon the type of connector to be used. A small gap may exist between the surface of the holder and the surface of the polishing film material. A visualization surface is disposed below the holder so the operator's view of the contact between the end of the ferrule and the polishing surface will be enhanced. The drive shaft may be spring-loaded so that it may be axially retracted to accommodate installing the selected arbor and film.

In operation, the polishing disc with acoustic qualities is fitted to the polishing wheel. The connector containing the ferrule with the cleaved fiber to be polished and reduced is inserted into the appropriate bore in the holder and it is advanced until it engages the surface of the polishing film causing the film to be slightly depressed. The drive shaft is then actuated, either manually or by means of electric motor. As the drive shaft is rotated, the polishing is disc is rotated and the indexed carrier is axially advanced across the face of the coarse polishing disc causing the fiber optic ends to be polished and reduced. The user can can both tactilely, visually and audibly determine when the polishing reduction is complete by the change in tone during the reduction process. The tonal change is initiated when the polishing film has reduced the fiber nub down to a point so that the polishing film is no longer in contact exclusively with the fiber nub but rather with the fiber nub and the ferrule end. The ferrule end can be checked by using an optical device such as a fiber microscope to confirm the proper finish has been achieved.

It is important to note the vertical orientation of the polishing disc and attached lapping film. Conventional polishing techniques orientate the lapping film on a horizontal plane allowing polishing debris and other contaminates to accumulate on the polishing surface. The vertical orientation of the polishing medium hinders any accumulation of contaminates on the lapping film surface as gravitational force tends to remove them from the surface. A second provision for contaminate removal may be utilized, as well, by providing a mounting means for a small whisk, or brush. or pad on the connector holder and immediately adjacent, above and/or below the point through which the ferrule contacts the polishing surface. The whisk, brush, or pad will sweep any remaining contaminates from the polishing surface.

In an alternate embodiment, the holder is driven by a small hand wheel which may be turned to slowly advance the holder to place the ferrule end in engagement with the polishing material.

In order to enhance the audible features of the fiber nub reduction process, the polishing device may also include a microphone mounted in proximity of the polishing wheel surface including an amplifying circuit with a connector for headphones. The headphones can be worn by the operator and the operator can, with minimal practice, determine when the polishing operation is satisfactorily completed by a noticeable change in the sound generated during the polishing operation.

BRIEF DESCRIPTION OF THE DRAWINGS

The above and other objects and advantages of the present invention will be more apparent from the following detail description taken in connection with the accompanying drawings.

DETAILED DESCRIPTION OF THE DRAWINGS

Figure 7:
FIG. 7 shows a ferrule before polishing.
Figure 8:
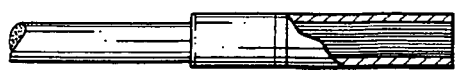
FIG. 8 shows a ferrule after polishing.

Referring to the drawings, FIGS. 7 and 8, show a fiber optic cable C encased in cladding, the distal end of which terminates at ferrule F. Fiber optic cables are typically provided in various sizes such as 3 microns, 9 microns, 62.5 microns and 100 micron diameter. The cladding is a protective optical encapsulation over the light transmitting fiber core. The ferrule is ceramic or metal and comprises a part of a connector for coupling fiber optic cables to one another to minimize losses. Once the ferrule is attached to the end of the cable, fiber nubs project slightly from the distal end of the ferrule, as seen in FIG. 7, and, in order to insure good connection, the end faces of the fiber must be polished to the condition shown in FIG. 8.

The fiber optic polishing device of the present invention is generally designated by the numeral 10 and consists of a generally planar base plate 12 which may be provided with pads 14 to provide frictional engagement with the working surface to prevent sliding. A frame 15 includes a pair of spaced-apart plates 16 and 18 extending from the base plate and secured by a plurality of transversely extending pins 20. A drive shaft 24 extends transversely through the plates at an intermediate location and are mounted in suitable, anti-friction bearings and has a polishing wheel 40 on its outer end.

Figure 11:
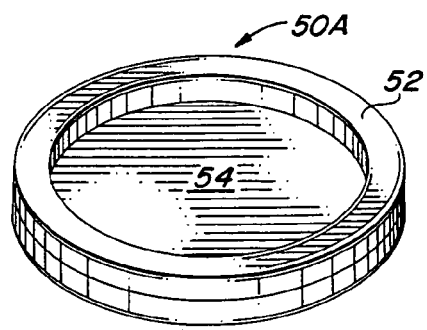
FIG. 11 is a perspective view of the acoustic arbor with an air gap used for initial polishing.

The drive shaft is maintained in position by a spring 25 exerting biasing force between a shoulder 21 on the shaft and plate 18. This allows the shaft to be moved rearwardly against the spring force to access the polishing wheel to change the arbor or film. The outer end of the drive shaft is shown as being provided with a cylindrical weight 30 which serves as a flywheel which carries a projecting hand wheel 32. The opposite or distal end of the drive shaft extends through plate 18. The polishing wheel 40 is mounted on a distal end of the shaft for rotation with the shaft. The polishing wheel is a disc having a front face 42. The front face defines an undercut slot 44 which receives the lugs 48 on the arbor plate 50 or 50A for the polishing film disc. Polishing film arbor 50A has an annular rim 52 which defines a central, generally circular recess. The polishing film arbor may be of glass, rubber or lightweight plastic. The projecting lugs 48A on the rear of the annular arbor 50A allow the arbor to be easily attached to the front surface of the polishing wheel 40 and removed as necessary for replacement of the polishing film. Arbor 50A, when the film 60 is applied as seen in FIG. 11, has an air cushion in recess 54 behind the film 60. This arbor is normally used for initial air polishing to slightly abrade the fiber ends after cleaving and prior to final polishing.

Generally, the polishing is at least a two step process after initial reduction using the acoustic disc air polishing, the arbor 50A on the wheel 40 is replaced with arbor 50 having a planar front surface 52 and a rear surface having mounting lugs 48 insertable in the slot 44 in the wheel. The arbor 50 may be glass or other hard material, plastic and rubber over glass or rubber and the front face adhesively mounts the film 60. It will be apparent that when the hand wheel is manually turned, the polishing wheel will also turn. The relative size of the flywheel and the polish wheel both impart momentum to provide for smooth rotation.

The polishing film 60 is a polyester material available in varying grits such as 0.3, 1, 2, 5 micron sizes having an adhesive backing 62 applied to its backside. The adhesive backing may be protected by a removable cover. The polishing film is adhesively applied to the selected polishing film arbor.

Bevel gears 86 and 88 are driven through a transmission which includes gear 90 on shaft 24, gear 81 on shaft 91 and gears 83, 84 on shafts 92 and 85. Bevel gear 88 drives the lead screw 90. In a preferred embodiment, the lead screw is a ¼" shaft with 20 tpi. The indexing rate may be "shifted" by selectively changing the gears 81, 82, 83 and 84. This can be quickly accomplished by manually pulling the shafts 91, 92 and 85 axially and replacing the gears with gears having a different ratio. The gears are preferably secured to their respective shafts by removable collars such as collars 81A, 82A, 83A and 84A to facilitate a quick change. The shafts are held in place by snap rings 98.

A carrier 100 shown as a rectangular block is in threaded engagement with the indexing or lead screw. The carrier 100 also defines a bore through which guide rod 102 extends between the end plates. It will be apparent that by turning the hand wheel, the lead screw will be rotated through the series of gears 80, 81, 82, etc., and the bevel gears. Preferably the gear ratios and the thread pitch of the screw are selected so one complete turn of drive shaft 24 will advance the carrier approximately the outer diameter of the cable fiber. A cable fiber having an outer diameter of 125 microns is equal to about 0.005". 20 thread pitch equals about 0.05" advance per revolution. The hand wheel transmission ratio is established at 10:1 so the carrier advances about 0.005" per revolution of the drive shaft. In this instance, the carrier will move the ferrule across the surface of the polishing film at a rate of about one diameter per revolution so the ferrule is always on fresh film as polishing occurs and the film is substantially, completely utilized.

The carrier includes a holder 110 which extends upwardly from the carrier. The holder has one or more bores 112 sized and shaped to receive a connector such as ST, SC or FC type connectors. The holder may also define bores which are angularly disposed to polish ferrules at an oblique angle as required when using some connectors. It will be seen that a small space 120 exists between the face of the holder and the face of the polishing film. In order to provide the user better visualization of the work piece, a surface 125 of the base plate beneath the polishing wheel are preferably light colored to provide good contrast with the ferrule.

As pointed out above, polishing ferrule fibers is generally at least a two step process. The ferrules are attached to the cable fiber by use of an adhesive such as an epoxy. The cable is cut or cleaved leaving projecting fiber nubs N which extend from the end of the ferrule. The initial step is to abrade these nubs sufficiently so that when subsequent polishing occurs, the nubs will not break. Conventional practice is to hand polish the nubs which is sometimes referred to as air polishing. Air polishing is followed by one or more polishing steps using polishing films of selected grits. These films are available from suppliers such as FIS and are generally various grits such as 0.3, 1, 2 micron as well as other sizes. The film typically has a polyester backing with an alumina oxide abrasive surface.

In use, the technician will insert a connector into the appropriate bore 112 in the holder first using the annular arbor 50A supporting a polishing film of selected grit size. The operator will press the connector forwardly until the end of the ferrule engages the surface of the polishing film, preferably causing it to indent slightly. The user will then crank the hand wheel which will, through the series of gears, impart rotation to the carrier and will also rotate the polishing wheel. The recess 54 provides an air cushion with an acoustic chamber by which the operator may easily hear the sound of the polishing/grinding operation. The initial polishing/grinding operation is continued until the tonal change alerts the operator that the polishing/grinding operation is complete and the fiber optic nubs N extending from the ends of the ferrule are knocked down. The light-colored surface on the base below the working area will assist the user in visually determining when polishing is complete.

Figure 9:
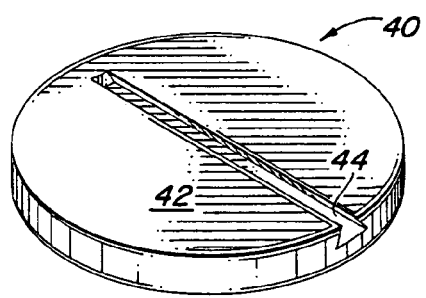
FIG. 9 is a perspective view of the polishing wheel.
Figure 12:
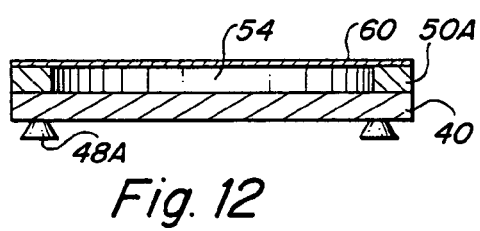
FIG. 12 is a cross-sectional view of the polishing wheel shown with the arbor of FIG. 11.
Figure 10:
FIG. 10 is a side view of the polishing wheel with a planar arbor attached thereto.

After the nubs have been initially polished and reduced, the annular arbor 50A is removed from the wheel and replaced with a planar arbor 55, as seen in FIG. 9, having a polishing face to which a film having a selected grit is applied by an adhesive backing. Normal replacement of the arbors is easily accommodated by the mounting lugs on each arbor which slide into the slot 44 on the wheel. The drive shaft 24 may also be axially retracted by manual force to overcome the bias of spring 25 to facilitate changing of the film and/or arbor plate.

A significant advantage of the present invention is that the device will utilize substantially all of the polishing film on the polishing wheel. As the entire diameter of the polishing film can be utilized during polishing, normally a single ferrule will generally only utilize an annular band portion of the wheel having a width of about 0.100 inches.

It should also be noted that while the invention was designed for polishing fiber optic fibers that the invention may also be used to grind or polish the ferrules that encase fiber optic fibers so that those ferrules might be shaped for a particular purpose.

In an alternate embodiment of the present invention, the hand wheel may be replaced with a small reversible DC motor. The motor can be selectively operated in either direction to cause the carrier to move in one direction or the other.

Figure 1:
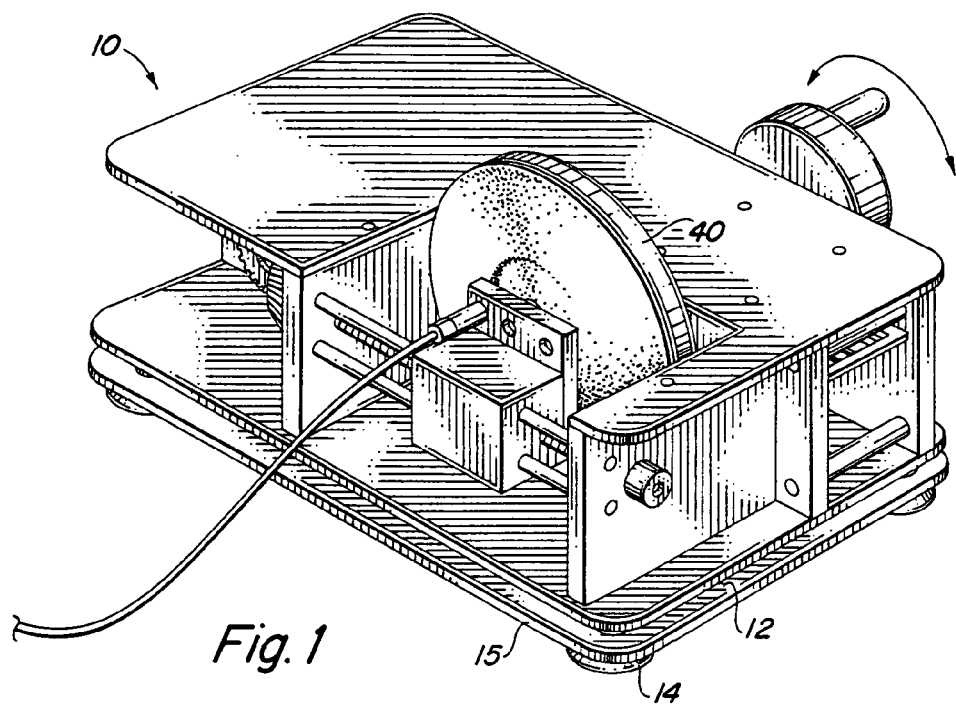
FIG. 1 is a perspective view of the polishing device of the present invention.
Figure 2:
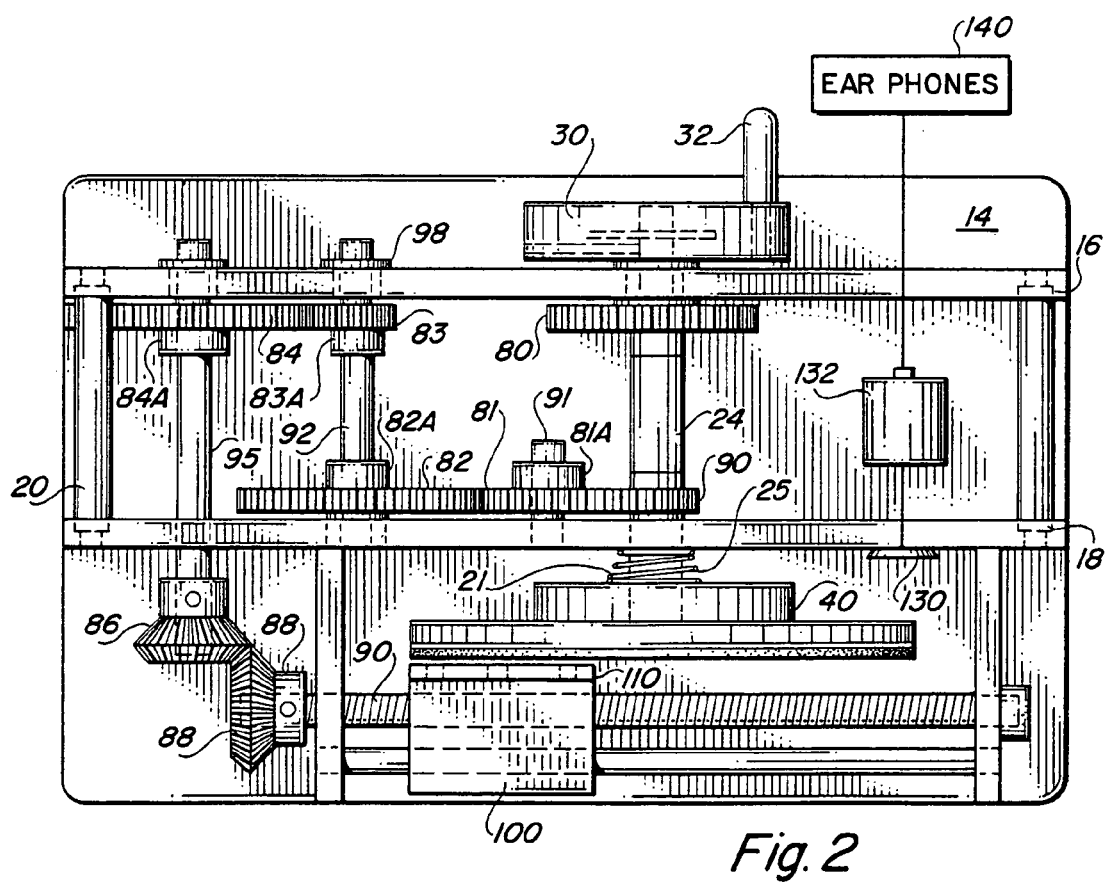
FIG. 2 is a top view thereof.
Figure 3:
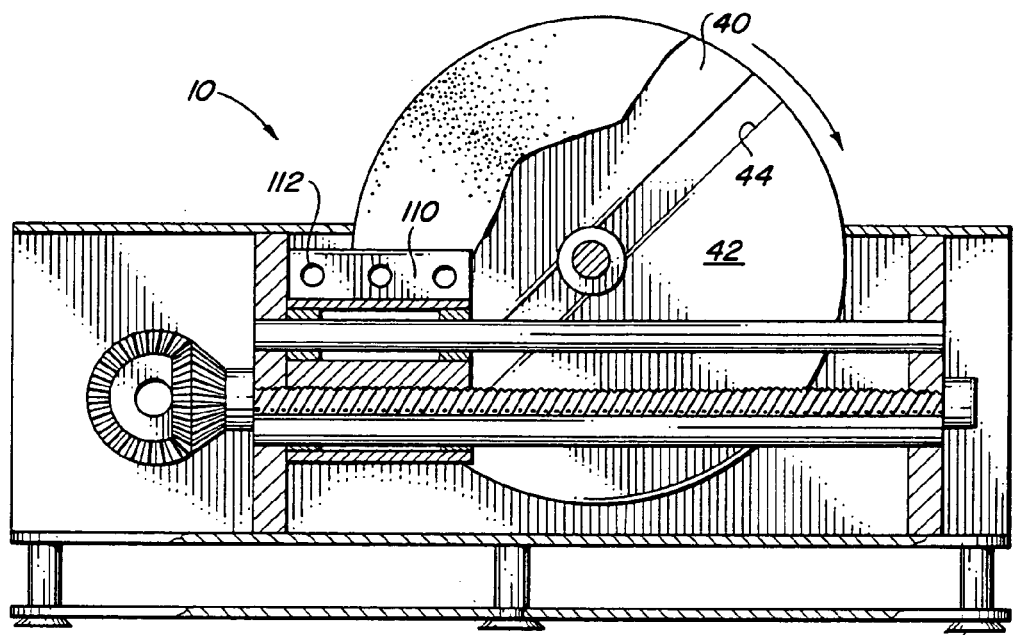
FIG. 3 is a front view thereof.
Figure 4:
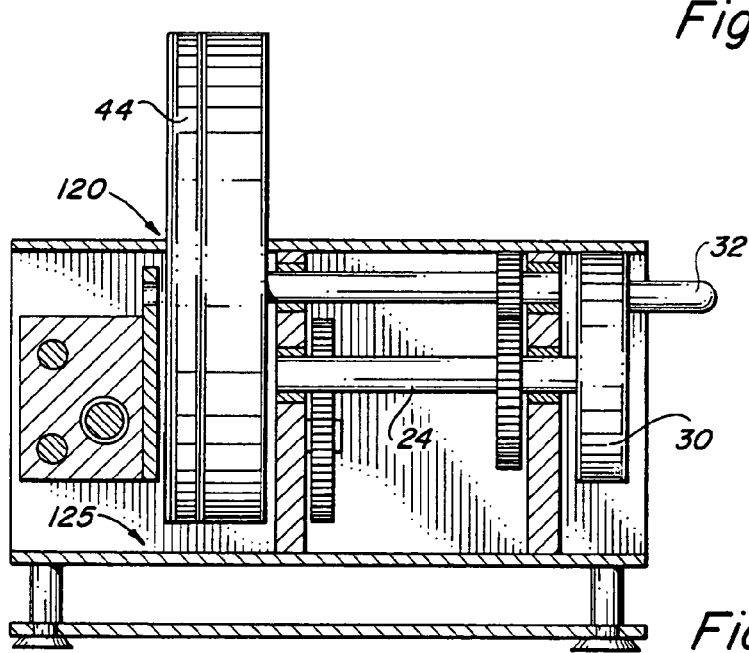
FIG. 4 is a left side view thereof.

As indicated above, the polishing/grinding nub reduction operation can be inspected visually to determine when it has been completed. However, it has been found the polishing/grinding nub reduction operation can also be audibly monitored. To accomplish this, as shown in FIG. 2, a small microphone 130 is mounted on the exterior of wall 18 adjacent the polishing wheel 40. The microphone 130 is connected to a small circuit board 132 including an amplifier and suitable power source. The circuit board can be connected to a headset 140 which can be worn by the user. During the polishing operation, the user will monitor the polishing operation through the headphones. As the polishing operation initially begins, a harsh grinding sound will be imparted. As the optical fibers are polished to a smooth condition, the grinding will gradually subside to a smooth whirring sound. At this point, the user through audible monitoring, will receive audible feedback indicating the polishing procedure has been completed.

Figure 5:
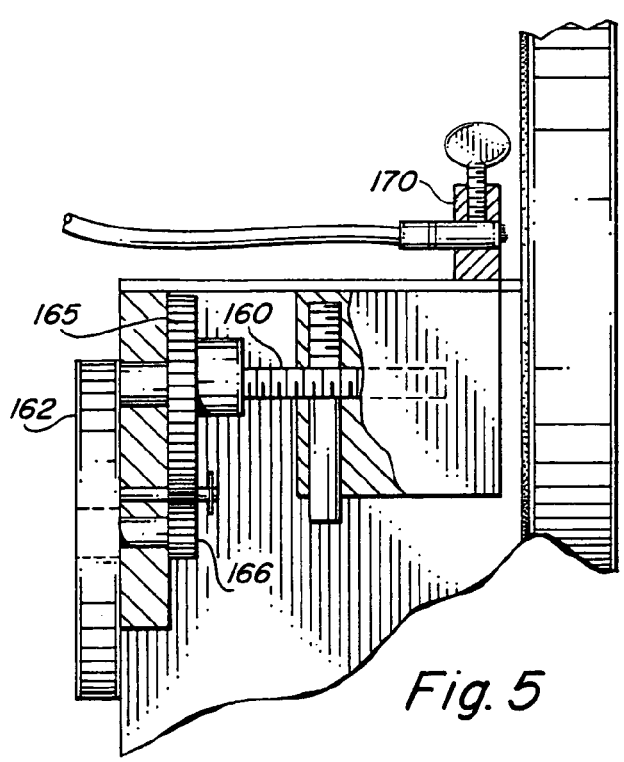
FIG. 5 is a detail view of an alternate embodiment of the holder with a connector in place ready for polishing.
Figure 6:
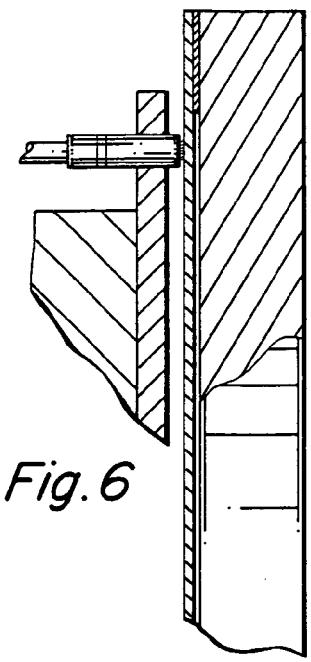
FIG. 6 shows the ferrule end engaging the polishing film.

In an alternate embodiment as shown in FIG. 5, the holder 100 which defines the bores 112 which receive the ferrule is shown as being slidably mounted on the surface of the carrier on a lead screw 160. The holder may be advanced or retracted with respect to the polishing wheel by means of a thumb wheel 162 which rotates the threaded lead screw extending from the holder through gears 165, 166. The thumb wheel is fixed so as it is rotated in one direction or the other, it will advance or retract the holder 100. Ferrules are inserted into the holder and are secured in place by a setscrew 170 extending from the top of the holder intercepting the bore into which the ferrules are inserted.

It will be obvious to those skilled in the art to make various changes, alterations and modifications to the invention described herein. To the extent these various changes, alterations and modifications do not depart from the spirit and scope of the appended claims, they are intended to be encompassed therein.

I claim:

1. A method of polishing a fiber optic ferrule connected to an optical fiber cable comprising:

(a) providing a polishing film having a surface;
(b) providing a holder for the ferrule for maintaining said ferrule in a position against said surface;
(c) rotating said film surface; and
(d) indexing said holder to move at a predetermined rate approximately equal to the outer diameter of the cable fiber each revolution of the film surface.

2. The method of claim 1 wherein said film surface is on a polishing wheel driven by a drive shaft.

3. The method of claim 2 wherein said holder is moved by a transmission from said drive shaft.

4. A fiber optic device for polishing fiber optic fiber ends and ferrules comprising:
(a) a base;
(b) a drive shaft having a polishing mounting wheel with a face to which a polishing medium may be secured;
(c) a holder for maintaining a ferrule in a position to be polished adjacent the polishing medium;
(d) indexing means driven by said drive shaft for moving said holder transversely across the polishing wheel at a predetermined rate; and
(e) transmission means for changing the gear ratio so that different indexing rates may be established for different polishing requirements.

5. The fiber optic device of claim 4 wherein said drive shaft is driven by manually operable means.

6. The fiber optic device of claim 4 wherein said drive shaft mounting wheel is driven by a reversible motor.

7. A fiber optic device for polishing fiber optic fiber ends and ferrules comprising:
(a) a base;
(b) a drive shaft having a polishing mounting wheel with a face to which a polishing medium may be secured;
(c) a holder for maintaining a ferrule in a position to be polished adjacent the polishing medium; and
(d) indexing means driven by said drive shaft for moving said holder transversely across the polishing wheel at a predetermined rate, said indexing means being driven from said drive shaft at a rate approximately equal to the diameter of the cable fiber per revolution of the drive shaft.

8. The fiber optic device of claim 7 wherein said arbor plate is planar.

9. The fiber optic device of claim 7 wherein said drive shaft is driven by manually operable means.

10. The fiber optic device of claim 7 wherein said drive shaft mounting wheel is driven by a reversible motor.

11. A fiber optic device for polishing fiber optic fiber ends and ferrules comprising:
(a) a base;
(b) a drive shaft having a polishing mounting wheel with an arbor plate to which a polishing medium may be detachably secured;
(c) a holder for maintaining a ferrule in a position to be polished adjacent the polishing medium;
(d) indexing means driven by said drive shaft for moving said holder transversely across the polishing wheel at a predetermined rate; and
(e) said arbor plate being generally annular defining a central recess thereby defining an acoustic chamber.

12. The fiber optic device of claim 11 wherein said drive shaft is driven by manually operable means.

13. The fiber optic device of claim 11 wherein said drive shaft mounting wheel is driven by a reversible motor.

14. A fiber optic device for polishing fiber optic fiber ends and ferrules comprising:
(a) a base;
(b) a drive shaft having a polishing mounting wheel with a face to which a polishing medium may be secured;
(c) a holder for maintaining a ferrule in a position to be polished adjacent the polishing medium;
(d) indexing means driven by said drive shaft for moving said holder transversely across the polishing wheel at a predetermined rate; and
(e) electronic means for audibly monitoring the polishing of fiber optic ends and ferrules.

15. The fiber optic device of claim 14 wherein said drive shaft is driven by manually operable means.

16. The fiber optic device of claim 14 wherein said drive shaft is driven by manually operable means.

* * * * *